No. 698,819. Patented Apr. 29, 1902.
W. CONNELLY.
ROD COUPLING.
(Application filed May 6, 1901.)
(No Model.)
Fig. 1.
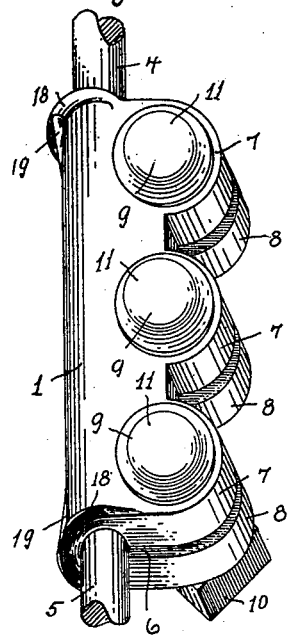
Fig. 6.
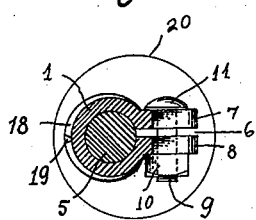
Fig. 2.
Fig. 5.
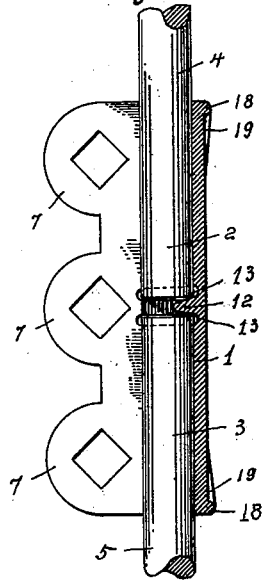
Fig. 3.
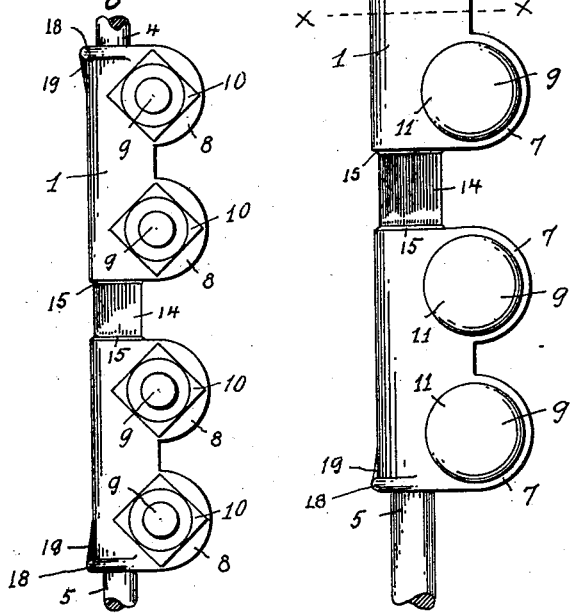
Fig. 4.
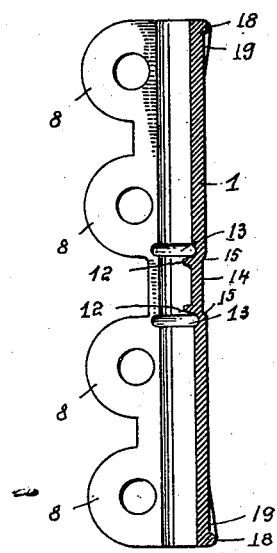
Witnesses—
Chas. A. Boake
Geo. A. Whitney Jr.
Inventor—
William Connelly
By Wilson & Martin
his Attorneys
THE NORRIS PETERS CO., PHOTO-LITHO., WASHINGTON, D. C.

UNITED STATES PATENT OFFICE.

WILLIAM CONNELLY, OF TOLEDO, OHIO.

ROD-COUPLING.

SPECIFICATION forming part of Letters Patent No. 698,819, dated April 29, 1902.

Application filed May 6, 1901. Serial No. 58,911. (No model.)

*To all whom it may concern:*

Be it known that I, WILLIAM CONNELLY, a citizen of the United States, residing at Toledo, in the county of Lucas and State of Ohio, have invented a new and useful Improvement in Rod-Couplings, of which the following is a specification.

My invention relates to rod-couplings, and has for its objects to produce a device of the kind that is simple and economical in construction, strong, durable, and secure, conveniently applied, and readily removed. I attain these objects by constructing my coupling as hereinafter set forth and described, and illustrated in the drawings, in which—

Figure 1 is an isometric view of my invention in a form adapted for coupling surface rods. Fig. 2 is a cross-section of the same, showing a stop to gage and equalize its application to each rod and annular grooves to receive the burs of the rods. Fig. 3 is a plan view of my invention in form adapted for coupling sucker-rods for oil-wells and having a square shoulder for attaching an elevator. Fig. 4 is a sectional view of the same, showing a double stop and an annular groove for each stop. Fig. 5 is also a plan view of a modified form of a sucker-rod coupling, showing an additional squared shoulder at the upper end of the coupling for attaching an elevator; and Fig. 6 is a cross-section on line x x of Fig. 5.

In the drawings, 1 designates the body of the coupling, being a tubular sleeve, preferably an integral casting, having a bore of a diameter to freely receive within the sleeve the ends 2 and 3 of the rods 4 and 5, respectively, for coupling them together end to end. The sleeve is formed with a slot 6, which is cut through the wall of the sleeve and extends from end to end on one side thereof. Integral with the sleeve on one side of the slot 6 are a plurality of ears 7 and on the opposite side of the slot an equal number of ears 8, each ear 8 being opposite to an ear 7. The ears thus arranged form pairs which are located at intervals along the slot in the sleeve. All of the ears are perforated, and the perforation of one ear of each pair is preferably squared to receive the square shank of a compression-bolt 9, with which each pair of ears is provided. Each compression-bolt is threaded and provided with a nut 10 and a head 11, by means of which when the rod ends are introduced into the sleeve the sleeve is compressed thereon. It is apparent that by providing the ears with cylindrical perforations, one ear of each pair being threaded, a machine-bolt may be substituted for bolt 9 and the nuts 10 may be omitted.

To insure equal length of insertion of the rod ends within the sleeve, I have provided within the bore of the sleeve one or two stops 12, projecting from the inner wall of the sleeve and located at equal distances from its ends, against which the ends of the rods abut and prevent unequal insertion and obviate measurement to ascertain when the ends of the rods are inserted the proper distance.

In cutting the rods into definite lengths a bur is sometimes formed on the end of the rod by the cutting-tool or the diameter is increased at the point of severance, and an end in this condition inserted in the sleeve would prevent equal compression of the sleeve upon the rod. To obviate the injurious results from defective ends of rods and insure equal compression upon the full length of the inserted ends without removing the bur, I have provided an annular groove 13 for each rod end in the inner wall of the sleeve, on the abutting side or sides of each stop, of a depth and area to receive a burred or otherwise defective end of a rod and allow the sleeve to be compressed equally on all parts of the rod ends.

In Figs. 3 and 4 there is shown a form of my coupling adapted to couple sucker-rod sections. For this and other similar purposes the coupling is provided with an intermediate squared portion 14 and shoulders 15, formed in the sleeve, for connecting thereto an elevator. In this form the coupling is adapted to the separate compression of each rod end by providing a plurality of pairs of ears disposed upon opposite sides of the squared portion 14, whereby one end of a rod may be uncoupled without affecting the compression of the opposite rod end. To attain this result, the coupling is lengthened and the distance between the stops 12 correspondingly increased, whereby when the bolts of one end of the coupling are loosened that end will have room to expand and release the rod in that end, while the rod in the other end of the coupling remains compressed.

In Fig. 5 there is shown a modified form of coupling for the same purpose of increased length to provide at the upper end a recessed squared portion 16 and a shoulder 17 for the convenient attachment of an elevator. In this form the central squared portion 14 provides a convenient means of holding the coupled rods by a wrench or the like while the elevator is being attached or detached. It is obvious, however, that when provision is made for attachment of the elevator at the end of the coupling the central reduced portion 14 may be omitted, or vice versa, and that either one or both may be used for the purpose without departing from the principle of construction shown and described. As constructed for this purpose the slot cuts through the sleeve at one side of a diametric line, as shown in Fig. 6, in order to bring the head and nut of the bolt within the same radius from the axis of the tube 20 when inserted therein and allow its free movement.

To strengthen the ends of the coupling and prevent them from splitting under the pressure of the bolts, I have provided them with the strengthening-ribs 18 and 19.

What I claim as new is—

1. In a rod-coupling, the combination of a tubular sleeve of uniform bore, having an exterior reduced portion at one end forming an end shoulder for engaging an elevator, and a longitudinal slot extending from end to end along one side, cutting through the wall of the sleeve, and provided with a plurality of pairs of ears integral with the sleeve projecting laterally at intervals along the sleeve, the ears of each pair being set opposite on opposite sides of the slot, a compression-bolt through each pair of ears, and a stop within the orifice of the sleeve, projecting from one side of the interior wall, adapted to limit the distance that a rod may be introduced into the sleeve from each end respectively.

2. In a rod-coupling, the combination of a tubular sleeve, having a central and an end reduced portion forming shoulders for engaging an elevator, and a longitudinal slot extending from end to end of the sleeve and through the wall of the sleeve along one side, and provided with a plurality of pairs of ears integral with the sleeve, on each side of the central reduced portion, projecting laterally at intervals along the slot, the ears of each pair being set oppositely to each other on opposite sides of the slot; a compression-bolt through each pair of ears; a stop projecting radially within the orifice of the sleeve, adapted to limit the distance that a rod may be introduced into the sleeve from each end respectively.

3. In a rod-coupling, the combination of a tubular sleeve, having a central and an end reduced portion forming shoulders for engaging an elevator, and a longitudinal slot extending from end to end of the sleeve and through the wall of the sleeve along one side, and provided with a plurality of pairs of ears integral with the sleeve, on each side of the central reduced portion, projecting laterally at intervals along the slot, the ears of each pair being set oppositely to each other on opposite sides of the slot; a compression-bolt through each pair of ears; a stop projecting radially within the orifice of the sleeve, adapted to limit the distance that a rod may be introduced into the sleeve from each end respectively; and an annular groove in the inner wall of the sleeve, adjacent to the abutting face of each stop.

In witness whereof I have hereunto set my hand this 4th day of May, A. D. 1901.

WILLIAM CONNELLY.

Witnesses:
F. S. MACOMBER,
CHAS. A. BOAKE.